United States Patent
Tonkikh

(10) Patent No.: US 8,134,619 B2
(45) Date of Patent: Mar. 13, 2012

(54) COLUMN NOISE REDUCTION DEVICE AND METHOD THEREOF

(75) Inventor: Artyom Tonkikh, Rehovot (IL)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 883 days.

(21) Appl. No.: 12/216,318

(22) Filed: Jul. 2, 2008

(65) Prior Publication Data

US 2009/0147089 A1 Jun. 11, 2009

Related U.S. Application Data

(60) Provisional application No. 60/947,532, filed on Jul. 2, 2007.

(51) Int. Cl.
 *H04N 3/14* (2006.01)
 *H04N 5/335* (2011.01)
 *H04N 5/217* (2011.01)
 *H04N 5/235* (2006.01)

(52) U.S. Cl. ............ 348/294; 348/230.1; 348/241

(58) Field of Classification Search .......... 348/228.1, 348/229.1, 294–301, 311–314, 230.1, 241
See application file for complete search history.

(56) References Cited

U.S. PATENT DOCUMENTS

| 2001/0041012 | A1* | 11/2001 | Hsieh et al. | 382/234 |
| 2004/0233324 | A1* | 11/2004 | Galambos et al. | 348/372 |
| 2005/0231620 | A1* | 10/2005 | Fraenkel et al. | 348/308 |

* cited by examiner

*Primary Examiner* — Alicia M Harrington

(74) *Attorney, Agent, or Firm* — Harness, Dickey & Pierce, P.L.C.

(57) ABSTRACT

An image sensor and method for column noise reduction may reduce decrease the visibility of fixed pattern noise. The image sensor may include an analog processing circuit and a digital processing circuit. The analog processing circuit may be configured to selectively permutate columns of pixel data based on a permutation signal, each column of pixel data including pixel data associated with at least one pixel in a pixel array. The digital processing circuit may be configured to convert the permutated pixel data into digital data and selectively re-order the columns of pixel data based on the permutation signal. The method for capturing an image may include selectively permutating columns of analog pixel data based on a permutation signal, converting the permutated analog pixel data into the digital domain and selectively re-ordering columns of the digital permutated pixel data based on the permutation signal.

20 Claims, 4 Drawing Sheets

COLUMN NOISE REDUCTION DEVICE AND METHOD THEREOF

PRIORITY STATEMENT

This U.S. non-provisional patent application claims the benefit of U.S. Provisional No. 60/947,532, filed on Jul. 2, 2007, the disclosure of which is incorporated in its entirety by reference.

BACKGROUND

1. Field

Example embodiments relate to noise reduction of captured images, for example, column noise reduction of captured images.

2. Description of the Related Art

An image sensor typically detects light reflected off of a subject and converts the detected light into an electrical signal. The reflected light may be detected by a pixel array of the image sensor, where the pixel array includes a plurality of rows and columns of pixels. A variety of analog processing circuitry then processes the electrical signal output from the pixel array. The electrical signal is representative of the amount of detected light. The processed electrical signal is then converted from the analog domain (e.g., an analog signal) to the digital domain (e.g., a digital signal).

One of the challenges faced by conventional image sensors is that of reducing column fixed pattern noise (FPN). Generally, the main sources of noise in a sensor are a column amplifier (CA) and a thresh and hold (T&H) capacitor. Alternatively, the T&H capacitor may refer to a sample and hold capacitor. For instance, a Cameroon sensor may have one CA and one T&H capacitor per column. The T&H capacitor may add two types of noise: column FPN and frame dependent noise. The amount of column FPN may depend on a type of chip being used by the image sensor. The amount of frame dependent noise may vary according to numerous factors such as image exposure, sensor temperature, etc.

Column FPN may generally be reduced for each column by adding an offset to each column. However, temporal noise as well as some column FPN may still remain. In addition, the added column offset generally does not correct for the column FPN added by the T&H capacitor.

SUMMARY

Example embodiments provide images sensors and methods for column noise reduction to decrease the visibility of fixed pattern noise (FPN).

According to example embodiments, an image sensor may include an analog processing circuit and a digital processing circuit. The analog processing circuit may be configured to selectively permutate columns of pixel data based on a permutation signal. Each column of pixel data may include pixel data associated with at least one pixel in a pixel array. The digital processing circuit may be configured to convert the permutated pixel data into digital data and selectively re-order the columns of pixel data based on the permutation signal.

Example embodiments of the image sensor may also include a shuffle random generator configured to generate the permutation signal. The image sensor may further include a pixel array including a plurality of pixels arranged in a matrix.

According to example embodiments, the analog processing circuit may be further configured to store and amplify the permutated pixel data. The analog processing circuit may include a plurality of switch boxes configured to selectively permutate the columns of pixel data in response to the permutation signal and store the permutated pixel data, a plurality of column amplifiers configured to selectively amplify the permutated pixel data in response an amplification signal, a multiplexer configured to select an output of one of the plurality of column amplifiers in response to a column selection signal, and an analog processing unit configured to process the pixel data received from the multiplexer and to output the pixel data to the digital processing circuit.

At least one of the plurality of switch boxes may include a least one thresh hold (T&H) capacitor to store the pixel data. The number of columns of pixel data permutated by the plurality of switch boxes may be based on the amount of noise added by the at least one T&H capacitor.

According to example embodiments, the digital processing circuit may be further configured to correct for fixed pattern noise added by the analog processing circuit. The digital processing circuit may further include an analog-to-digital (ADC) converter configured to convert the permutated pixel data into the digital domain, a fixed pattern noise (FPN) correction unit configured to output a fixed pattern noise offset, a summation unit configured to add the fixed pattern noise offset to the pixel data output by the ADC converter, and a re-order unit configured to re-order the permutated pixel data based on the permutation signal.

The re-order block may re-order the permutated pixel data into the order of the pixel data read from the pixel array. The re-order block may also re-order the permutated pixel data into the same order as before the pixel data was permutated.

The FPN correction unit may output the fixed pattern noise offset based on noise added to the pixel data by at least one of a T&H capacitor and a column amplifier. The noise added by at least one of the T&H capacitor and the column amplifier may be the following:

$$p' = a \cdot p + b$$

$$a = 1 + \Delta g_f + \Delta g_d,$$

$$b = 1 + \Delta o_f + \Delta o_d$$

where p is the original value of the pixel data, p' is the value of the pixel data with the noise, $\Delta g_f$ is the fixed gain, $\Delta g_d$ is the frame dependent gain, $\Delta o_f$ is the fixed offset and $\Delta o_d$ is the frame dependent offset.

According to example embodiments, a shuffle random generator for generating a permutation signal for permutating columns of pixel data may include a linear feedback shift register (LFSR) configured to generate a plurality of number sequences, a counter configured to provide a plurality of initial states for the LFSR, and a table configured to store each of the number sequences corresponding to each of initial states and output one of the number sequences as the permutation signal based the initial state of the counter. The LFSR may be reset to a first value at the beginning of each frame of pixel data.

Example embodiments may provide a method of capturing images. According to at least one example embodiment, the method may include selectively permutating columns of analog pixel data based on a permutation signal, converting the permutated analog pixel data into the digital domain, and selectively re-ordering columns of the digital permutated pixel data based on the permutation signal. Prior to converting the permutated analog pixel data into the digital domain, the method may further include storing the permutated analog pixel data and amplifying the stored permutated analog pixel data.

According to example embodiments, the method may further include correcting fixed pattern noise in the digital pixel data prior to re-ordering. The selective re-ordering may reorder the columns of pixel data to the order of the analog pixel data read from the pixel array.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting, and wherein.

DETAILED DESCRIPTION OF EXAMPLE EMBODIMENTS

Figure 1:
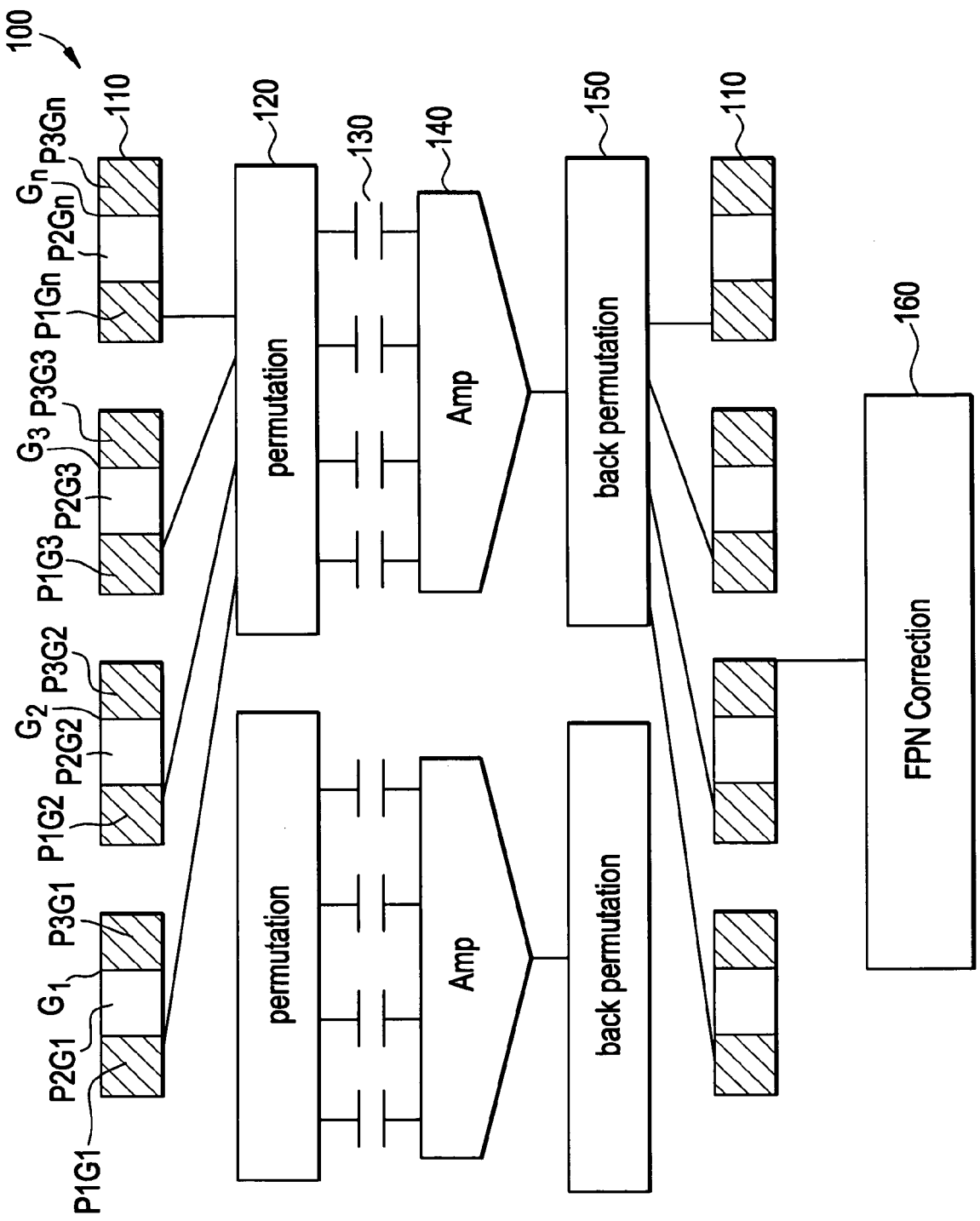
FIG. 1 is a block diagram illustrating an image sensor according to example embodiments.

Detailed example embodiments are disclosed herein. However, specific structural and functional details disclosed herein are merely representative for purposes of describing example embodiments. Accordingly, example embodiments are capable of various modifications and alternative forms. It should be understood, however, that there is no intent to limit example embodiments to the particular forms disclosed, but on the contrary, example embodiments are to cover all modifications, equivalents, and alternatives falling within the scope of the application.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent", etc.).

Unless otherwise defined, all terms (including technical and scientific terms) used herein have the same meaning as commonly understood by one of ordinary skill in the art to which example embodiments belongs. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

It should also be noted that in some alternative implementations, the functions/acts noted may occur out of the order noted in the FIGS. For example, two FIGS. shown in succession may in fact be executed substantially concurrently or may sometimes be executed in the reverse order, depending upon the functionality/acts involved.

Specific details are given in the following description to provide a thorough understanding of example embodiments. However, it will be understood by one of ordinary skill in the art that example embodiments may be practiced without these specific details. For example, systems may be shown in block diagrams in order not to obscure example embodiments in unnecessary detail. In other instances, well-known processes, structures and techniques may be shown without unnecessary detail in order to avoid obscuring example embodiments.

Also, it is noted that example embodiments may be described as a process which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process may be terminated when its operations are completed, but could have additional steps not included in the figure. A process may correspond to a method, a function, a procedure, a subroutine, a subprogram, etc. When a process corresponds to a function, its termination may correspond to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to, portable or fixed storage devices, optical storage devices, wireless channels and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Example embodiments will now be described more fully with reference to the accompanying drawings.

Figure 2:
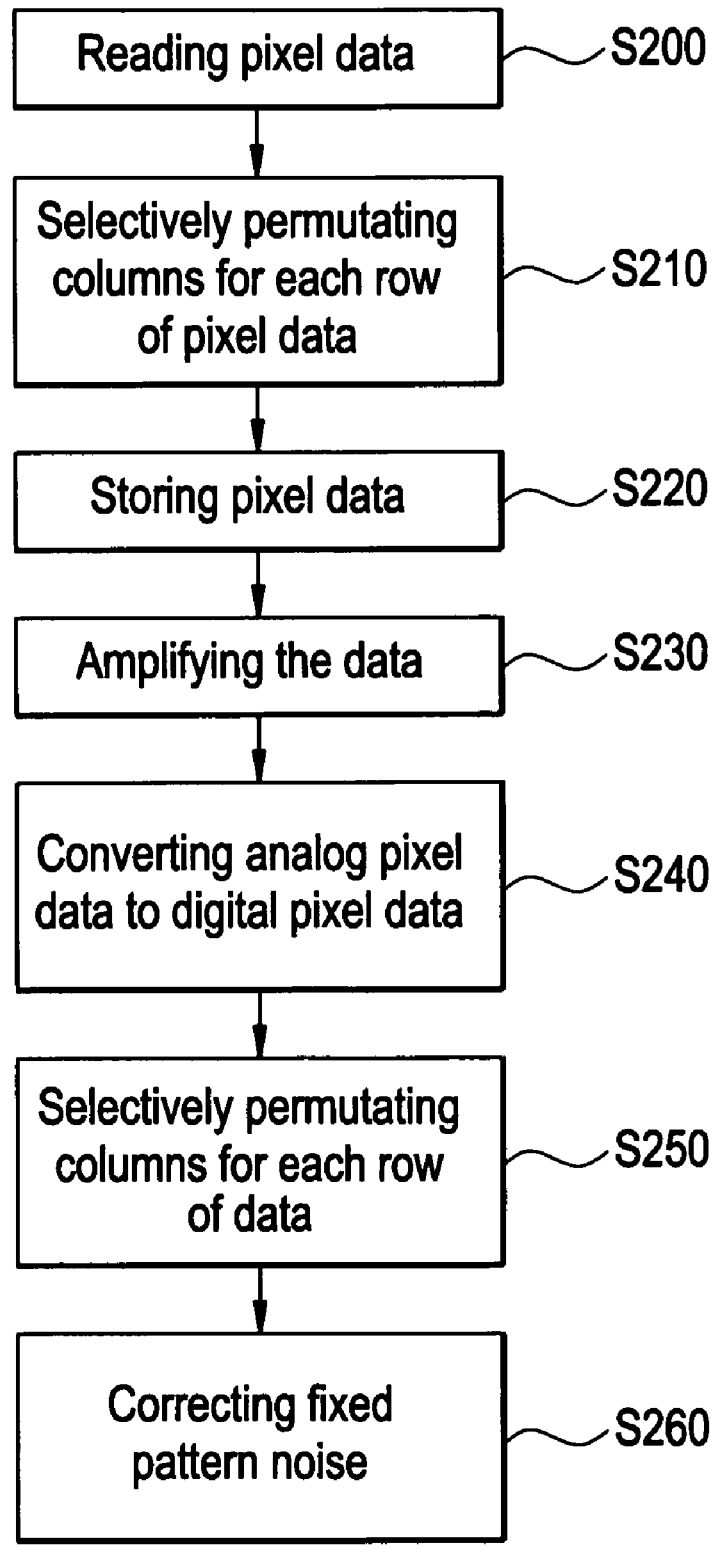
FIG. 2 is a flow diagram illustrating a method for capturing an image according to example embodiments.

FIG. 1 is a block diagram illustrating an image sensor according to example embodiments. FIG. 2 is a flow diagram illustrating a method for capturing an image according to example embodiments. The method of FIG. 2 may be performed by the image sensor shown in FIG. 1, and thus, the example embodiments shown in FIGS. 1 and 2 will be described together. In some cases, example embodiments will be described with regard to a single pixel, row of pixels or column of pixels. However, it will be understood that this is for example purposes. According to example embodiments, the same or substantially the same processes described with regard to, for example, a single row of pixels may be performed for one or more (e.g., all) rows of pixels in the pixel array. Moreover, it will be understood that multiple rows of pixels may be permutated and/or re-ordered simultaneously or concurrently. As discussed above, a pixel array may include a plurality of rows and columns.

Figure 5:
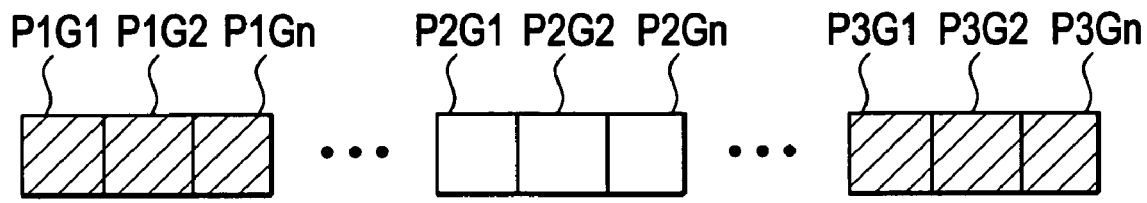
FIG. 5 shows an example of a permutated pixel row according to example embodiments.

Referring to FIGS. 1 and 2, at S200 a pixel row 110 may be read into the permutation unit 120. At S210, the read pixel row may be permutated by the permutation unit 120. For example, the pixels in the pixel row 110 may be grouped into pixel groups $G_n$, in which each pixel group includes a number of adjacent pixels m, where m is an integer. With regard to FIG. 1, for example, the first pixel group $G_1$ may include three pixels P1G1, P2G1, and P3G1, the second pixel group $G_2$ may include three pixels P1G2, P2G2, and P3G2, and so on. The pixels within the pixel row 110 may then be permutated by re-arranging the pixels in a different order. FIG. 5 illustrates an example of a permutated version of the pixel row 110 shown in FIG. 1. As shown, the first pixel from each of the plurality of pixel groups may be selected successively and ordered from left to right. The second pixel from each of the plurality of pixel groups may then be selected successively and order from left to right. The third pixel from each of the plurality of pixel groups may then be selected successively and ordered from left to right.

Still referring to FIGS. 1 and 2, at S220 the permutated data may be stored in thresh and hold (T&H) capacitors 130. Although shown separately, S210 and S220 may be interchangeable and/or may be combined into a single operation.

As mentioned in the background, there may be two types of noise added by the T&H capacitors 130: column fixed pattern noise (FPN) and frame dependent noise. For example, the noise added by the T&H capacitors 130 may be determined by the following set of equations:

$$p' = a \cdot p + b$$
$$a = 1 + \Delta g_f + \Delta g_d$$
$$b = 1 + \Delta o_f + \Delta o_d \quad (1)$$

In the above equations, p represents the original value of the pixel data and p' represents the value of the pixel data with the T&H capacitor noise. The constant a depends on the fixed gain $\Delta g_f$ and the frame dependent gain $\Delta g_d$. The constant b depends on the fixed offset $\Delta o_f$ and the frame dependent offset $\Delta o_d$.

Referring back to FIGS. 1 and 2, the pixel data may be output from the T&H capacitors 130 to the column amplifiers 140. At S230, the pixel data may be selectively amplified by the column amplifiers 140. Column amplifier noise may be further added to the pixel data by the column amplifiers 140 in a similar manner to the T&H noise, as shown by the above equation (1).

As shown in FIG. 2, at S240, the pixel data may be converted from the analog domain to the digital domain by an analog to digital converter (ADC) (not shown). At step S250, the back permutation unit 150 may perform back permutation on the pixel data 110. For example, the back permutation unit 150 may reorder the pixels within the pixel row 110 into their original order. Thus, the pixel data 110 may have the same order as when the pixel data was initially read at S200 and before being permutated by the permutation unit 120 at S210. Although shown as separate steps, S240 an S250 may be combined into a single operation. At S260, the FPN correction unit 160 may perform FPN correction per column amplifier according to the following equation:

$$p_{result} = p_{output} + \Delta \quad (2)$$

In the above equation, $p_{output}$ represents the value of the pixel data output at one of the steps S240 and S250, $\Delta$ represents an offset value of the FPN correction unit 160 and $p_{result}$ represents the value of the pixel data with the added offset value. As S250 and S260 may be interchangeable, the back permutation unit 150 and the FPN correction unit 160 may also be interchangeable in order of operation.

Figure 3:
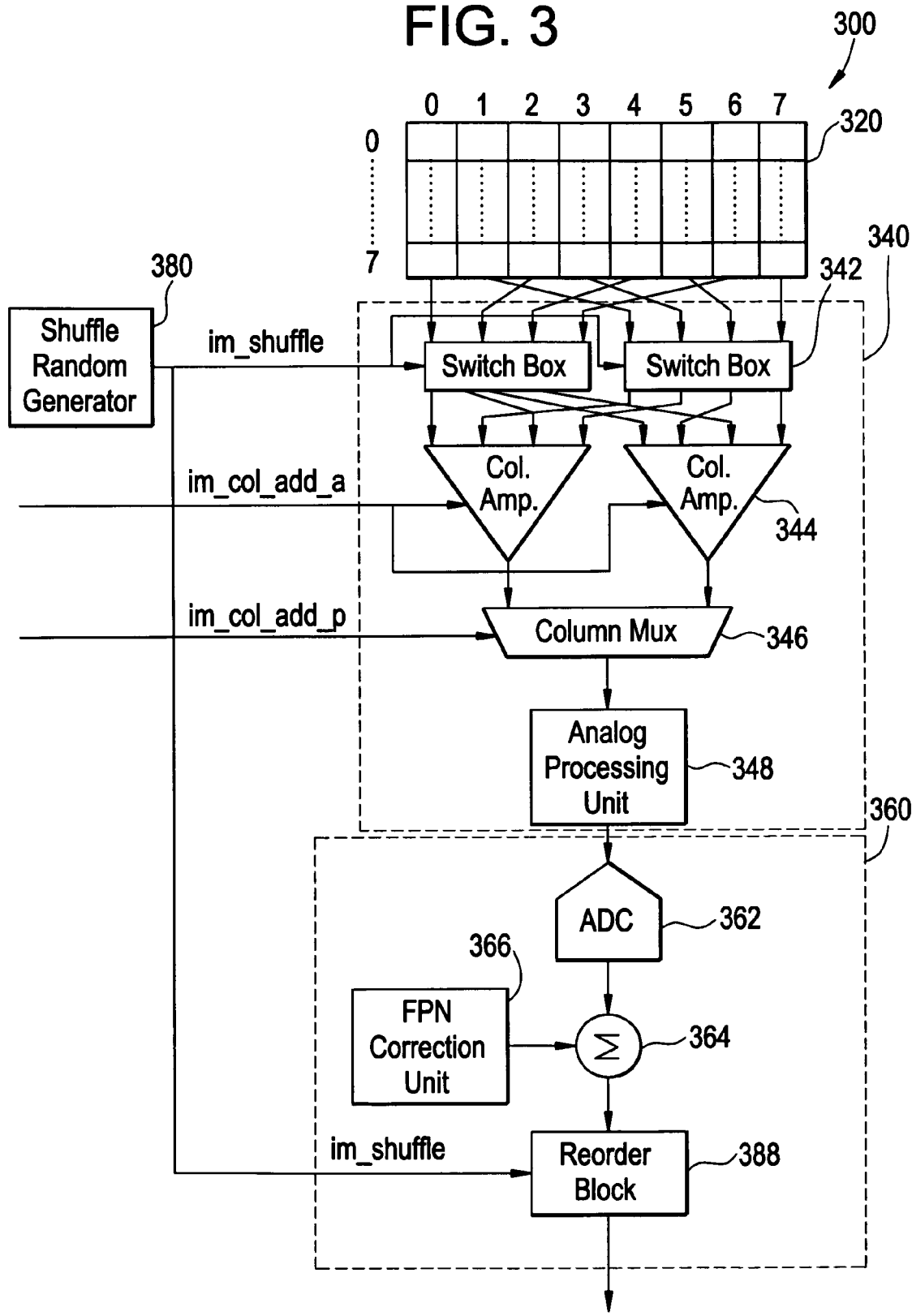
FIG. 3 is another block diagram illustrating an image sensor according to example embodiments.

FIG. 3 is another block diagram illustrating an image sensor 300 according to example embodiments. The image sensor 300 may include a pixel array 320, an analog process circuit 340, a digital processing circuit 360 and a shuffle generator 380. Although shown as being included in the image sensor 300, in the alternative the shuffle random generator 380 may be external to the image sensor 300.

The analog processing circuit 340 may include switch boxes 342, column amplifiers 344, a column multiplexer 346 and an analog processing unit 348. The digital processing circuit 360 may include an analog-to-digital converter (ADC) 362, a summation unit 364, a FPN correction unit 366, and a reorder block 368.

The image sensor 300 may receive a number of control signals. For example, the switch boxes 342 and the re-order block 368 may receive the permutation signal im_shuffle from the shuffle random generator 380. The column amplifiers 344 may receive the column address signal im_col_add_a and the column multiplexer 346 may receive the column address signal im_col_add_p generated by one or more column address generators (not shown).

Referring still to FIG. 3, the pixel array 320 may include, for example, eight columns 0-7. A row of pixel data may be read from the pixel array 320 and then randomly permutated according to column by the switch boxes 342 in response to the permutation signal im_shuffle from the shuffle random generator 380. For example, the number and selection of columns permutated for each row of pixel data may depend on the permutation signal im_shuffle. The switch boxes 342 may also include T&H capacitors (not shown), which may add noise to the pixel data.

Still referring to FIG. 3, the pixel data may be selectively amplified by the column amplifiers 344 in response to column address signal im_col_add_a. The column amplifiers 344 may also add noise to the pixel data. The column multiplexer 346 may then select the output of one of the column amplifiers 344 for processing by the analog processing unit 348 in response to the column address signal im_col_add_p.

The pixel data may be output from the analog processing unit 348 of the analog processing circuit 340 to the digital processing circuit 360. Within the digital processing circuit 360, the ADC 362 may convert the pixel data output from the analog processing unit 348 from the analog domain (an analog signal) to the digital domain (a digital signal). An offset from the FPN correction unit 366 may be added to the pixel data at the summation unit 364. Each row of pixel data may then be re-ordered according to column by the reorder block 368. For example, the reorder block 328 may receive the permutation signal im_shuffle from the shuffle random generator 380 indicating the permutation order of the pixel columns. The re-order block 368 may rearrange the pixel data back to the original order in which the pixel data was read out of the pixel array 320.

The pixel data may be further processed by other hardware and/or software to be output for display (not shown) through any known viewing medium in the art ranging from, for example, a liquid crystal display (LCD) screen to a printer.

Figure 4:
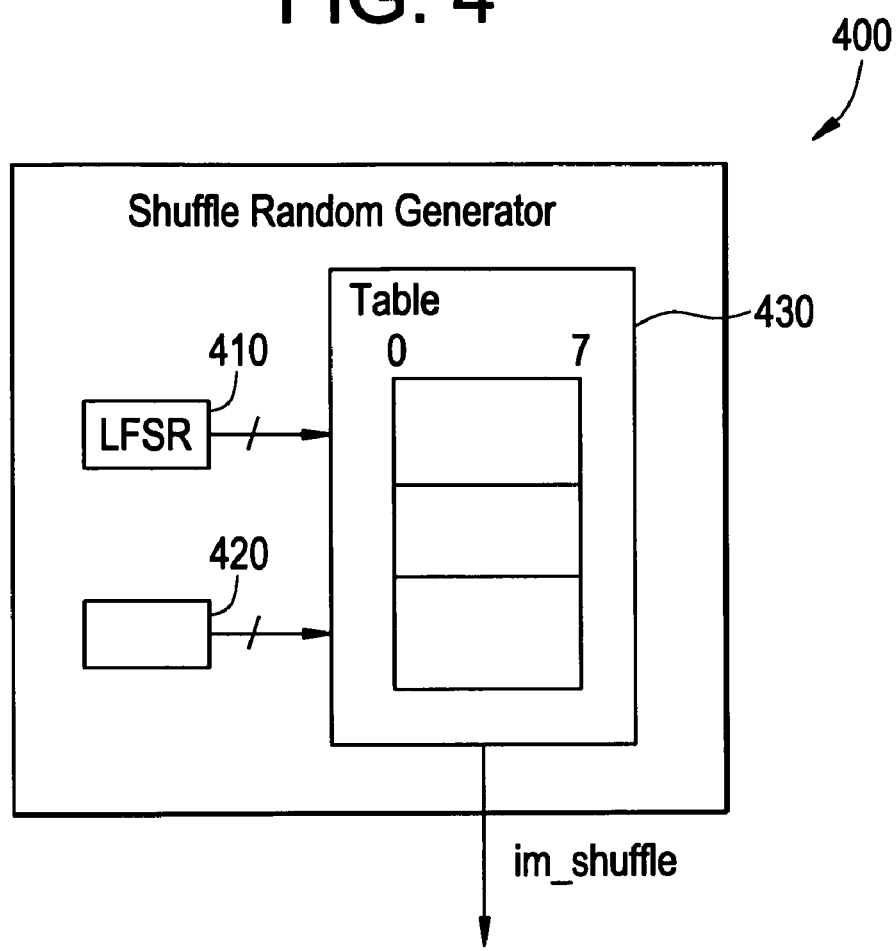
FIG. 4 is a block diagram illustrating the shuffle random generator of FIG. 3 according to example embodiments.

FIG. 4 illustrates the shuffle random generator 400 of FIG. 3 according to example embodiments. Referring to FIG. 4, the shuffle random generator 400 may include a linear feedback shift register (LFSR) 410, a counter 420 and a table 430. The LFSR 410 may act as a pseudo-random number generator (PRNG). The LFSR 410 may output three-bit states in a pseudo-random order. In this example, the states are 3 bits in size, 8 possible permutations is possible for any given initial state.

The counter 420 may sequentially count from 0 to 2, resetting to the number 0 after reaching the number 2. The counter 420 may serve as a seed state for the LFSR 410. For example, the different sequences of numbers generated by LFSR 410 may depend on the initial seed state of the LFSR 410. Thus, the same seed state may generally produce the same sequence of numbers from the LFSR 410. As the counter 420 may produce three different states, and each state may result in 8 different permutations by the LFSR 410, a total of 24 different possible codes may be generated by the shuffle random generator 400. Each sequence for a given seed state may be stored in the table 430. The shuffle random generator 400 may select and output any one of the three sequences stored in the table 430 depending on the current state of the counter 420. Although discussed with regard to 24 different possible codes, a different number of codes may be generated by modifying the LFSR 410, counter 420 and/or table 430. Moreover, any other method or devices known in the art for generating a random or pseudo-random sequence of number may also be used.

According to example embodiments, the LFSR 410 may be reset to a same value at the beginning of each frame of pixel data. Otherwise, FPN may become temporal noise and the image may blink.

According to example embodiments, the number of permutated columns may depend on the amount of noise added by the T&H capacitors. Therefore, measurements of the amount of noise may be needed to make such a determination. For example, if most of the column FPN may be corrected using conventional techniques and the remaining temporal and column FPN that the T&H capacitors add is relatively low, then only four column permutations may be sufficient. Otherwise, if the level of remaining noise is relatively high, more than four column permutations may be needed.

Thus, example embodiments may reduce the amount of column FPN and temporal column noise (TCN) through the use of column permutation.

Although example embodiments illustrate the image sensor carrying out the column noise reduction for a pixel array 210 including eight columns, the above image sensor may be scalable for a various number of columns.

In the drawings and specification, there have been disclosed example embodiments and, although specific terms are employed, they are used in a generic and descriptive sense only and not for purposes of limitation. Those skilled in the art will appreciate that various modifications, additions and substitutions are possible, without departing from the scope and spirit of example embodiments as disclosed in the accompanying claims.

What is claimed is:

1. An image sensor, comprising:
   an analog processing circuit configured to selectively permutate columns of analog pixel data based on a permutation signal, each column of analog pixel data including analog pixel data associated with at least one pixel in a pixel array; and
   a digital processing circuit configured to convert the permutated analog pixel data into digital data and selectively re-order the columns of digital pixel data based on the permutation signal.

2. The image sensor of claim 1, further comprising:
   a shuffle random generator configured to generate the permutation signal.

3. The image sensor of claim 2, wherein the shuffle random generator includes,
   a linear feedback shift register (LFSR) configured to generate a plurality of number sequences,
   a counter configured to provide a plurality of initial states for the LFSR, and
   a table configured to store each of the number sequences corresponding to each of initial states and output one of the number sequences as the permutation signal based the initial state of the counter.

4. The image sensor of claim 3, wherein the LFSR is reset to a first value at the beginning of each frame of analog pixel data.

5. The image sensor of claim 1, further comprising:
   a pixel array including a plurality of pixels arranged in a matrix.

6. The image sensor of claim 1, wherein the analog processing circuit is further configured to store and amplify the permutated analog pixel data.

7. The image sensor of claim 6, wherein the analog processing circuit includes,
   a plurality of switch boxes configured to selectively permutate the columns of analog pixel data in response to the permutation signal and store the permutated analog pixel data,
   a plurality of column amplifiers configured to selectively amplify the permutated analog pixel data in response to an amplification signal,
   a multiplexer configured to select an output of one of the plurality of column amplifiers in response to a column selection signal, and
   an analog processing unit configured to process the analog pixel data received from the multiplexer and to output the analog pixel data to the digital processing circuit.

8. The image sensor of claim 7, wherein at least one of the plurality of switch boxes includes a least one thresh and hold (T&H) capacitor to store the pixel data.

9. The image sensor of claim 8, wherein the number of columns of analog pixel data permutated by the plurality of switch boxes is based on the amount of noise added by the at least one T&H capacitor.

10. The image sensor of claim 1, wherein the digital processing circuit is further configured to correct for fixed pattern noise added by the analog processing circuit.

11. The image sensor of claim 10, wherein the digital processing circuit includes,
an analog-to-digital converter configured to convert the permutated analog pixel data into the digital domain,
a fixed pattern noise correction unit configured to output a fixed pattern noise offset,
a summation unit configured to add the fixed pattern noise offset to the digital pixel data output by the analog-to-digital converter, and
a re-order unit configured to re-order the permutated digital pixel data based on the permutation signal.

12. The image sensor of claim 11, wherein the re-order block reorders the permutated digital pixel data into the order of the analog pixel data read from the pixel array.

13. The image sensor of claim 11, wherein the re-order block re-orders the permutated digital pixel data into the same order as before the analog pixel data was permutated.

14. The image sensor of claim 11, wherein the fixed pattern noise correction unit outputs the fixed pattern noise offset based on noise added to the analog pixel data by at least one of a T&H capacitor and a column amplifier.

15. The image sensor of claim 14, wherein the noise added by at least one of the T&H capacitor and the column amplifier is the following:

$p' = p + b$ $a = 1 + \Delta g_f + \Delta g_d,$ $b = 1 + \Delta o_f + \Delta o_d$ where p is the original value of the analog pixel data, p' is the value of the analog pixel data with the noise, $\Delta g_f$ is the fixed gain, $\Delta g_d$ is the frame dependent gain, $\Delta o_f$ is the fixed offset and $\Delta o_d$ is the frame dependent offset.

16. A shuffle random generator for generating a permutation signal for permutating columns of pixel data, the shuffle random generator comprising:
a linear feedback shift register configured to generate a plurality of number sequences;
a counter configured to provide a plurality of initial states for the LFSR;
and a table configured to store each of the number sequences corresponding to each of initial states and output one of the number sequences as the permutation signal based the initial state of the counter.

17. A method of capturing images, comprising:
selectively permutating columns of analog pixel data based on a permutation signal;
converting the permutated analog pixel data into the digital domain; and
selectively re-ordering columns of the digital permutated pixel data based on the permutation signal.

18. The method of claim 17, wherein prior to converting the permutated analog pixel data into the digital domain, the method further comprises:
storing the permutated analog pixel data;
amplifying the stored permutated analog pixel data.

19. The method of claim 17, further comprising:
correcting fixed pattern noise in the digital pixel data prior to re-ordering.

20. The method of claim 17, wherein the selective re-ordering reorders the columns of pixel data to the order of the analog pixel data read from the pixel array.

* * * * *